United States Patent
Kanskar et al.

(10) Patent No.: US 12,525,770 B2
(45) Date of Patent: Jan. 13, 2026

(54) METHOD, SYSTEM AND APPARATUS FOR DIFFERENTIAL CURRENT INJECTION

(71) Applicant: NLIGHT, INC., Camas, WA (US)

(72) Inventors: Manoj Kanskar, Camas, WA (US); Zhigang Chen, Camas, WA (US)

(73) Assignee: nLIGHT, Inc., Camas, WA (US)

( * ) Notice: Subject to any disclaimer, the term of this patent is extended or adjusted under 35 U.S.C. 154(b) by 809 days.

(21) Appl. No.: 17/419,055

(22) PCT Filed: Dec. 20, 2019

(86) PCT No.: PCT/US2019/068150
§ 371 (c)(1),
(2) Date: Jun. 28, 2021

(87) PCT Pub. No.: WO2020/142292
PCT Pub. Date: Jul. 9, 2020

(65) Prior Publication Data
US 2022/0077657 A1    Mar. 10, 2022

Related U.S. Application Data

(60) Provisional application No. 62/787,172, filed on Dec. 31, 2018.

(51) Int. Cl.
*H01S 5/042* (2006.01)
*H01S 5/20* (2006.01)
*H01S 5/34* (2006.01)

(52) U.S. Cl.
CPC ........ *H01S 5/2036* (2013.01); *H01S 5/04256* (2019.08); *H01S 5/3402* (2013.01); *H01S 5/04254* (2019.08); *H01S 2301/176* (2013.01)

(58) Field of Classification Search
CPC .................. H01S 5/04256; H01S 5/04254
See application file for complete search history.

(56) References Cited

U.S. PATENT DOCUMENTS

| | | | |
|---|---|---|---|
| 5,384,797 A | 1/1995 | Welch et al. | |
| 6,687,267 B2 | 2/2004 | Bukkems | |

(Continued)

FOREIGN PATENT DOCUMENTS

| | | |
|---|---|---|
| CN | 1379516 A | 11/2002 |
| CN | 103545714 A | 1/2014 |

(Continued)

OTHER PUBLICATIONS

RU Patent Office; International Search Report; PCT/US2019/068150 dated Feb. 18, 2020; 2 Pages.

(Continued)

*Primary Examiner* — Minsun O Harvey
*Assistant Examiner* — Stephen Sutton Kotter
(74) *Attorney, Agent, or Firm* — Wiley Rein LLP

(57) ABSTRACT

A laser diode, comprising a transverse waveguide comprising an active layer between an n-type semiconductor layer and a p-type semiconductor layer wherein the transverse waveguide is bounded by a lower index n-cladding layer on an n-side of the transverse waveguide and a lower index p-cladding layer on a p-side of the transverse waveguide a cavity that is orthogonal to the transverse waveguide, wherein the cavity is bounded in a longitudinal direction at a first end by a high reflector (HR) facet and at a second end by a partial reflector (PR) facet, and a first contact layer electrically coupled to the waveguide and configured to vary an amount of current injected into the waveguide in the longitudinal direction so as to inject more current near the HR facet than at the PR facet.

22 Claims, 6 Drawing Sheets

(56) References Cited

U.S. PATENT DOCUMENTS

| | | | |
|---|---|---|---|
| 2002/0048301 A1 | 4/2002 | Wang et al. | |
| 2002/0061044 A1 | 5/2002 | Kuniyasu et al. | |
| 2004/0120377 A1 | 6/2004 | Marsh | |
| 2006/0109833 A1 | 5/2006 | Uh et al. | |
| 2010/0284434 A1* | 11/2010 | Koenig | H01S 5/04254 |
| | | | 372/46.01 |
| 2019/0013649 A1* | 1/2019 | Vierheilig | H01S 5/1082 |
| 2020/0091681 A1* | 3/2020 | Gerhard | H01S 5/04254 |
| 2020/0161836 A1* | 5/2020 | Gerhard | H01S 5/04254 |
| 2021/0217925 A1* | 7/2021 | Inoue | H01S 5/0234 |

FOREIGN PATENT DOCUMENTS

| | | |
|---|---|---|
| DE | 102008014092 A1 | 7/2009 |
| DE | 102015116336 A1 | 3/2017 |
| WO | WO 2009/082999 A2 | 7/2009 |
| WO | 2018/081602 A1 | 5/2018 |
| WO | WO-2018081602 A2 * | 5/2018 ............ H01S 5/026 |
| WO | WO 2018/227004 A1 | 12/2018 |
| WO | WO 2020/142292 A1 | 7/2020 |

OTHER PUBLICATIONS

RU Patent Office; International Written Opinion; PCT/US2019/068150 dated Apr. 16, 2020; 4 Pages.
RU Patent Office; International Preliminary Report on Patentability; PCT/US2019/068150 dated Jul. 15, 2021; 6 Pages.
EP Patent Office; European Search Report; App. No. 19906763.8; Dated Aug. 12, 2022; pp. 1-9.

* cited by examiner

METHOD, SYSTEM AND APPARATUS FOR DIFFERENTIAL CURRENT INJECTION

RELATED APPLICATIONS

This application is a US national phase application, which claims priority to PCT Application No. PCT/US2019/068150, filed Dec. 20, 2019, which claims priority to U.S. Provisional Application No. 62/787,172, filed Dec. 31, 2018, which are incorporated herein by reference in their entireties.

TECHNICAL FIELD

The technology disclosed herein relates to diode lasers, more particularly to methods, systems and apparatus for tuning of current injection in a waveguide of a diode laser.

BACKGROUND

Lasers are light emitting devices. Light emission in a laser occurs as a result of optical amplification by stimulated emission of electromagnetic radiation. Some lasers emit spatially and temporally coherent light which allows lasers to emit light in a narrow light bandwidth that can be narrowly focused over long distances. There are a wide variety of lasers, for example, gas lasers, chemical lasers, dye lasers, metal-vapor lasers, solid-state lasers, and semiconductor lasers.

Laser diodes are electrically pumped semiconductor lasers formed by growing multiple layers of semiconductor materials on a suitable substrate with a lattice constant that allows choice of materials to produce desired emission wavelengths. Laser diodes typically comprise an active layer disposed between a p-type layer of semiconductor material and an n-type layer of semiconductor material. Many laser diodes are fabricated on a semiconductor substrate such as gallium arsenide (GaAs), doped with elements such as aluminum (Al), silicon (Si), zinc (Zn), carbon (C) or selenium (Se) to produce the n- and p-type semiconductor layers. The active layer is typically un-doped gallium-indium-arsenide (GaInAs) and may be only a few nanometers thick. In a typical laser diode when a forward-bias is applied, electrons and holes recombine in the active layer to produce light. The active layer (e.g., quantum well(s), quantum wire(s) or quantum dots, type-II quantum well(s)) resides in a waveguide layer which has a higher index of refraction compared to the surrounding p- and n-doped cladding layers. Light generated from the active layer is substantially confined (or "guided") in the plane of the waveguide.

Some broad area laser (BAL) edge-emitting Fabry Perot diodes are arranged as rectangular gain or index-guided semiconductor structures; other BALs, such as reduced-mode (REM) devices are arranged having flared laser oscillator waveguides, as is described in U.S. Pat. No. 9,166,369. In both BALs and REM devices, opposing end facets of the waveguide define high and partial reflectors to provide feedback for oscillation of light within the resonator. The longitudinal distance between the two opposing end facets is referred to herein as the "length" of the waveguide, lateral cavity, cavity, waveguide cavity and/or laser. The multi-layered laser diode structure extends the length of the laser and has a broad width for electrical injection extending to opposite side surfaces which also extend the length of the laser. The multi-layered semiconductor materials are typically arranged so that the laser operates in a single mode along the growth direction of the laser. This direction is defined as the fast-axis direction. Since along the fast-axis direction the semiconductor laser operates in a single mode, the brightness of the laser diode in this direction cannot be improved any further—it is so called diffraction-limited. The thickness or distance between the top and bottom surfaces of the multi-layered semiconductor laser structure provides the smaller dimension of the end facets. This "stripe thickness" is typically on the order of microns. The width of the multi-layered laser structure provides the larger dimension of the end facets. The "stripe width" is typically on the order of many tens of microns to hundreds of microns and is referred to as the "slow axis." Because the stripe-width is much larger than the wavelength of light, the lateral property of an optical field propagating along the optical axis of the waveguide is highly multimode. The slow-axis divergence angle is much smaller than the fast-axis divergence angle.

BALs are used in high power applications. Because BALs have multiple modes in the slow axis their slow-axis beam-parameter-product (BPP) tends to be higher than single-mode laser diodes. Furthermore, as they are driven to higher currents, the thermal lensing becomes more pronounced which causes higher index contrast profile in the lateral direction leading to accommodation of even more modes. Consequently, as the lateral divergence angle widens this leads to degradation in lateral beam-parameter-product (BPP) and brightness (power÷BPP).

For power-scaling applications and reducing the cost-per-watt of producing diode lasers, higher brightness at higher output power per emitter is very desirable. Brightness can be improved in BALs and REM devices by driving to higher current; however, the current at which the maximum brightness occurs also happens at progressively lower current values. Hence, the maximum output power at the maximum brightness also drops.

"Slope efficiency" is a metric obtained by plotting the laser output power against the input pump power. The slope efficiency is the slope of this line. When diode lasers are driven to high current, the slope efficiency not only starts to rollover, but it begins to droop. This droop becomes more prominent as diode laser cavity length increases. It is also more pronounced for wider emitter devices for a given cavity length as illustrated in FIG. 1 plotting L-I of 75 um and 150 um 5 mm and 8 mm BALs vs current. These observations evince a thermal penalty due to lateral thermal diffusion reducing slope efficiency.

Moreover, when output power is compared to current density, reduction in slope efficiency (i.e., drooping) is seen at lower current densities. FIG. 2 illustrates L-I of 75 um and 150 um 5 mm and 8 mm BALs vs current density (equivalent current) showing droop in L-I occurring at lower current density for longer cavity. The area formed by a product of 75 um×5 mm is considered a unit area for the plot. Usually, there is a longitudinal temperature gradient along the cavity. The output (partial reflector (PR)) facet end runs hotter compared to the back (high reflector (HR)) facet end. The root cause of this is non-uniform waste heat from a near exponential dependence of the optical intensity along the cavity direction, and an initial non-symmetric thermal boundary condition, both of which allows the high reflector side of the BAL to cool more efficiently.

At high drive currents, longitudinally varying waste heat and power-conversion leads to a progressively greater temperature difference from output (PR) facet to back (HR) facet. Hence the thermionic emission, which ultimately leads to carrier leakage and loss, also has a longitudinal dependence. More thermionic emission occurs in the front compared to the back of the laser. This is evident from the broadening of the spectral width as a function of drive current shown in FIGS. 3 and 4. FIG. 3 illustrates spectral width of an 8 mm×95 um (red) device and an 5 mm×95 um (blue) device as a function of linear current density (scaled with cavity length only). FIG. 4 illustrates spectral width of an 8 mm×95 um (red) device and a 5 mm×95 um (blue) device as a function of "canonical temperature" of the diode as determined by the centroid of the spectral width shift with current and an assumed 0.32 nm/C calibration factor for GaAs/InGaAs. As illustrated, at the same junction temperature, the spectral emission width of the 8 mm cavity length device is wider compared to a 5 mm cavity length device. This indicates that there is a larger temperature gradient in the longer cavity device.

There is also evidence that the droop is not due to longitudinal spatial hole burning (LSHB). FIG. 5 illustrates pulsed (5 μs 1% duty cycle) L-I up to >40 A showing no power droop which would have been present if LSHB had been a contributor. In fact, FIG. 5 shows a close to linear L-I curve in the same current range. LSHB would have resulted in droop in the L-I curve under such a pulsed condition.

The above described droop in slope efficiency at higher current densities is due at least in part to lateral cavity thermal diffusion which reduces the ability to extract higher power from laser diodes at high current densities, especially for longer cavity devices. Moreover, facet temperature increases and quantum well bandgap decreases near the output facet of the diode thereby adversely contributing to reliability. What is needed is a method and/or apparatus for ameliorating these negative effects on slope efficiency when driving BALs to higher currents directed at reducing the lateral cavity thermal diffusion which appears to contribute to the droop in slope efficiency.

SUMMARY

Disclosed herein is a laser diode comprising a transverse waveguide including an active layer between an n-type semiconductor layer on an n-side of the transverse waveguide and a p-type semiconductor layer on a p-side of the transverse waveguide wherein the transverse waveguide is bounded on the n-side by a lower index n-cladding layer and on the p-side by a lower index p-cladding layer; a cavity that is orthogonal to the transverse waveguide, wherein the cavity is bounded in a longitudinal direction at a first end by a high reflector facet and at a second end by a partial reflector facet; and a first contact layer configured to vary an amount of current injected into the cavity in the longitudinal direction so as to inject more current at the first end than at the second end.

The laser diode may be configured such that the first contact layer is disposed on an n-side of the transverse waveguide. The laser diode may be configured such that the first contact layer is disposed on the p-side of the transverse waveguide. The laser diode may be configured such that the first contact layer comprises a substantially uniform thickness. The laser diode may be configured such that the first contact layer comprises a material thickness gradient that increases longitudinally from the first end to the second end. The laser diode may be configured such that the first contact layer comprises a resistance gradient that increases longitudinally from the first end to the second end. The laser diode may be configured such that the first contact layer comprises a contact material surface area gradient that decreases longitudinally from the first end to the second end. The laser diode may be configured such that the first contact layer comprises dopants. The laser diode may be configured such that the first contact layer is highly doped. The laser diode may be configured such that the n-cladding layer underlying the first contact layer is moderately doped. The laser diode may be configured such that the p-cladding layer underlying the first contact layer is moderately doped. The laser diode may be configured such that the contact material surface area gradient comprises a contact pattern. The laser diode may be configured such that the contact pattern comprises a plurality of discrete contacts and is configured to grade the current injection through contact surface area size variation among different ones of the plurality of discrete contacts, wherein the surface area of the discrete contacts decreases longitudinally from the first end to the second end. The laser diode may be configured such that the contact pattern comprises a continuous shape configured to gradually decrease a contact material surface area distribution longitudinally from the first end to the second end. The laser diode may be configured such that the first contact layer comprises a metal alloy with reduced conducting properties. The laser diode may further comprise a second contact layer disposed opposite the first contact layer and comprising a different contact pattern.

Further disclosed herein is a laser diode comprising a transverse waveguide including an active layer between an n-type semiconductor layer on an n-side of the transverse waveguide and a p-type semiconductor layer on a p-side of the transverse waveguide wherein the transverse waveguide is bounded on the n-side by a lower index n-cladding layer and on the p-side by a lower index p-cladding layer; a cavity that is orthogonal to the transverse waveguide, wherein the cavity is bounded in a longitudinal direction at a first end by a high reflector facet and at a second end by a partial reflector facet; a first p-side contact and a second p-side contact that are electrically isolated from one another, wherein the first and second p-side contacts are electrically coupled to the cavity and an n-side contact, wherein the first p-side contact is configured to inject a first current density into the cavity and wherein the second p-side contact is configured to inject a second current density into the cavity.

The laser diode may be configured such that the first current density and the second current density are different. The laser diode may be configured such that the first p-side contact and the second p-side contact are evenly distributed along the cavity, wherein the first p-side contact is disposed proximate the first end and the second p-side contact is disposed proximate the second end and wherein the first current density is greater than the second current density.

The laser diode may be configured such that the first p-side contact and the second p-side contact are disposed closer to the first end than the second end such that when active more current is injected into the cavity closer to the first end than the second end. The laser diode may further comprise a third p-side contact and a fourth p-side contact that are electrically isolated from one another and electrically coupled to the cavity and an n-side contact. The laser diode may be configured such that the first p-side contact and the second p-side contact are coupled to respective ones of a first heatsink submount and a second heatsink submount. The laser diode may be configured such that the first p-side contact and the second p-side contact are different thicknesses. The laser diode may be configured such that the first p-side contact and the second p-side contact comprise materials having different resistive properties.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

DETAILED DESCRIPTION

Figure 1:
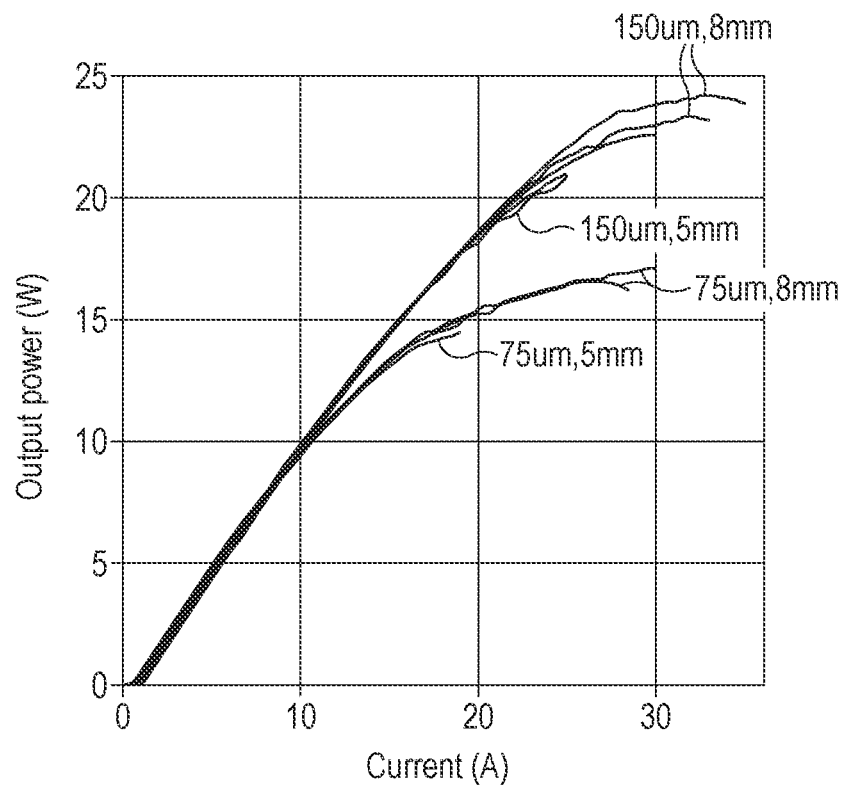
FIG. 1 illustrates L-I of 75 µm and 150 µm 5 mm and 8 mm BALs vs current.
Figure 2:
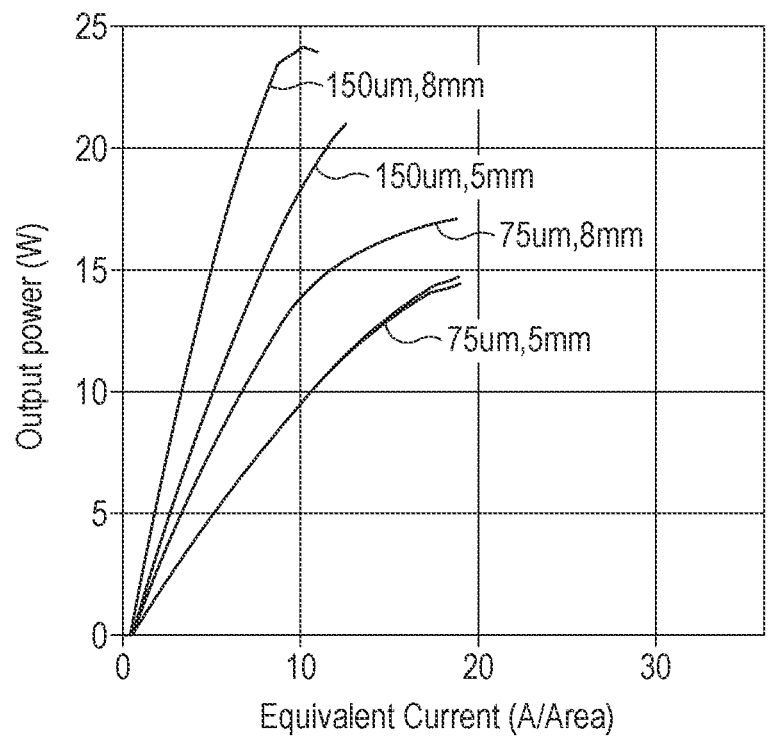
FIG. 2 illustrates L-I of 75 µm and 150 µm 5 mm and 8 mm BALs vs current density.
Figure 3:
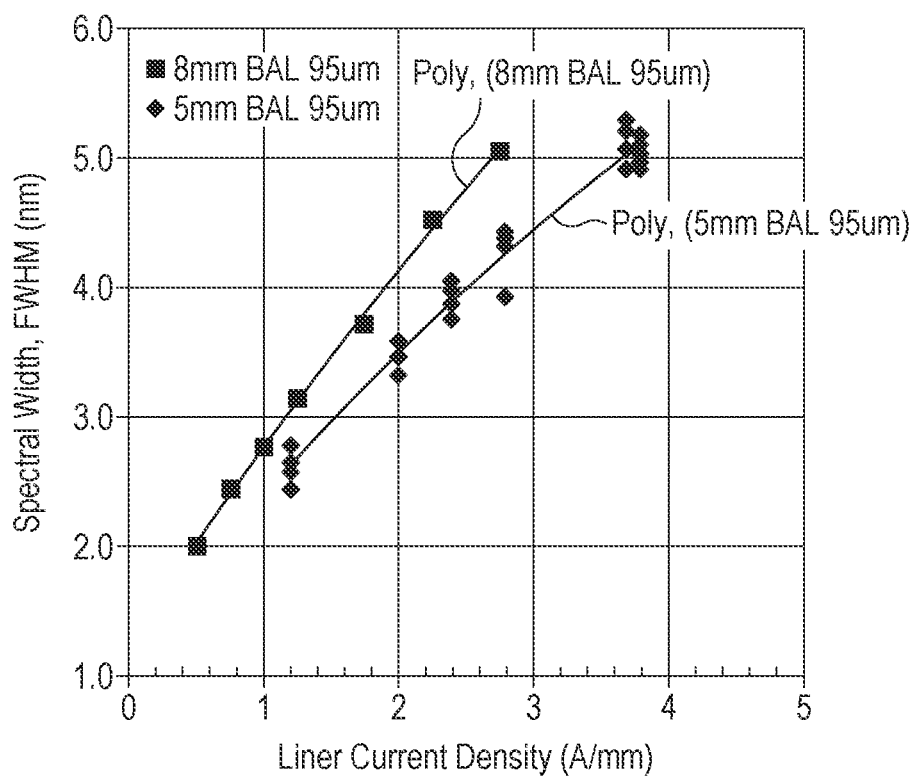
FIG. 3 illustrates spectral width of 8 mm×95 µm and 5 mm×95 µm as a function of linear current density.
Figure 4:
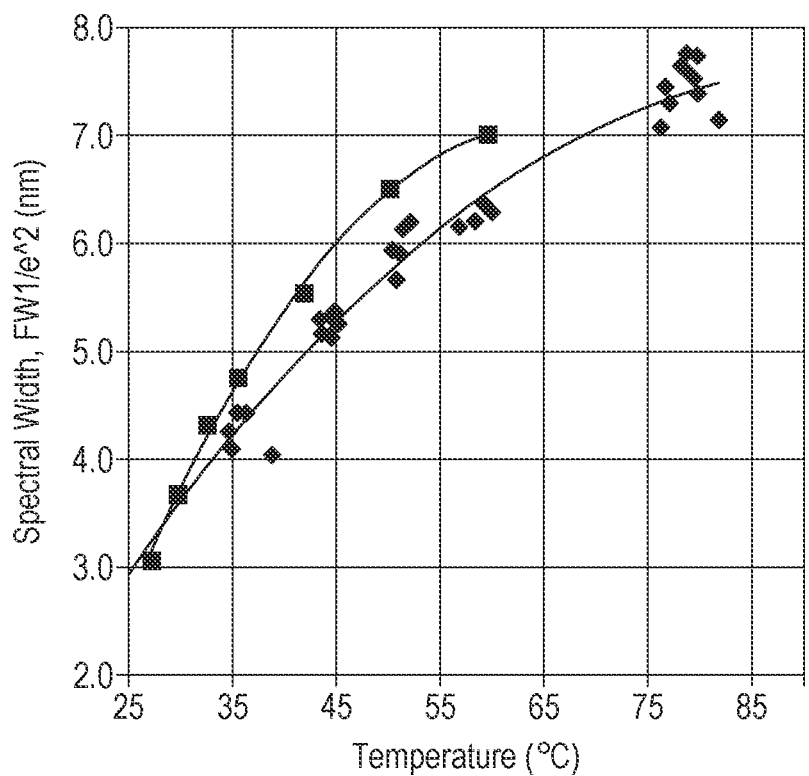
FIG. 4 illustrates spectral width of 8 mm×95 µm and 5 mm×95 µm as a function of "canonical temperature" of the diode i.e. the junction temperature.
Figure 5:
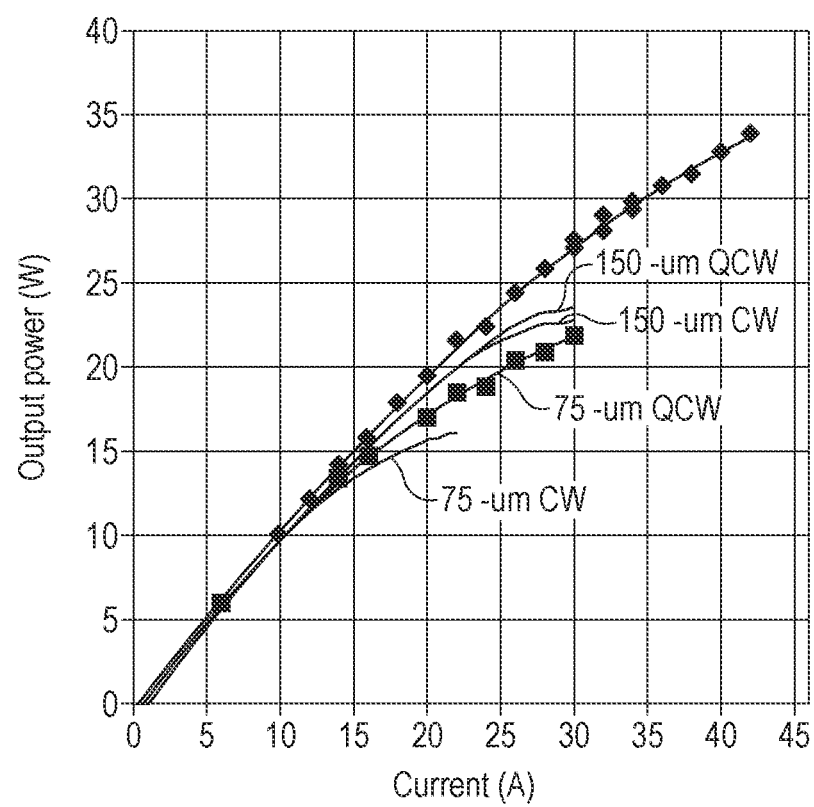
FIG. 5 illustrates a pulsed L-I up to >40 A.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed technology. These terms are high-level abstractions of the actual operations that are performed. The actual operations that correspond to these terms will vary depending on the particular implementation and are readily discernible by one of ordinary skill in the art.

In some examples, values, procedures, or apparatus' may be referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

For simplicity and illustrative purposes FIGS. 6-9 depict examples of a differential current injection contact layer (DCICL) configured to differentially inject current along the lateral cavity portion of quantum well lasers. However, various other types of lasers may be configured to include a DCICL. For example, a DCICL may be formed on double heterostructure lasers, interband cascade lasers, distributed Bragg reflector lasers, distributed feedback lasers, quantum cascade lasers, vertical cavity surface emitting lasers and/or vertical external cavity surface emitting lasers, to name a few. Therefore, claimed subject matter is not intended to be limited to quantum well laser diodes.

Disclosed herein are methods and devices for improving the detrimental effects of driving BALs to higher currents (e.g., greater than about 10 A), specifically reducing the droop in slope efficiency. The methods and devices are directed at reducing lateral cavity thermal diffusion in a laser diode which contributes to rollover and droop in slope efficiency. The methods include pumping the laser diode with different current densities along the cavity length to reduce the longitudinal thermal gradient and prevent or mitigate rollover and droop in L-I for all cases but particularly for longer cavity length laser devices where the cavity lengths are greater than about 5.0 mm in length. The most effective method is to pump the cavity with a continuously variable current density; the simplest method is to divide the cavity into two or more lengths of appropriate front and back sections and differentially pump the two or more sections with higher current density near the back high reflector end than the front partial reflector end. This can also reduce facet thermal load and local temperature on the facet. Further, it can mitigate the effect of bandgap shrinkage on the partial reflector facet compared to a uniformly pumped device.

Figure 6:
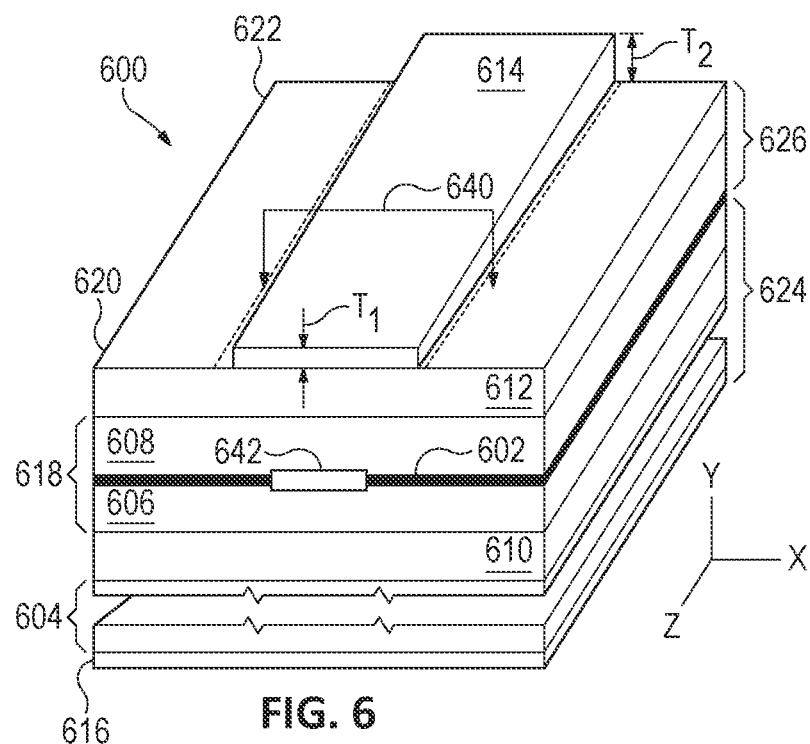
FIG. 6 illustrates a cross-sectional perspective view of an example vertical epitaxial layer structure including a differential current injection contact layer.

FIG. 6 illustrates a cross-sectional perspective view depicting a vertical epitaxial layer structure of an example laser diode 600 including a differential current injection contact layer (DCICL) 614. In an example, laser diode 600 is formed to include a substrate 604 (shown with a break in width), an n-type semiconductor layer 606 and a p-type semiconductor layer 608. An active layer, quantum well 602, resides between n-type semiconductor layer 606 and p-type semiconductor layer 608. An n-cladding layer 610 is disposed outside of n-type semiconductor layer 606 and has a lower index of refraction than n-type semiconductor layer 606. A p-cladding layer 612 is disposed outside of p-type semiconductor layer 608 and has a lower index of refraction than the p-type semiconductor layer 608. Quantum well 602, n-type semiconductor layer 606 and p-type semiconductor layer 608 make-up the transverse waveguide 618 portion of laser diode 600. The transverse waveguide 618 is bounded in the Y direction on n-side 624 by lower index n-cladding layer 610 and on p-side 626 by a lower index p-cladding layer 612. The boundaries of the n-side 624 and the p-side 626 are identified with brackets.

In the current example, DCICL 614 is a p-contact layer and is disposed on p-cladding layer 612. N-contact 616 is disposed on substrate 604. Cavity 640, defined by DCICL 614, is orthogonal to the transverse waveguide 618 and is bounded in the longitudinal or Z direction at a first end 620 by a high reflector (HR) facet 642 and at a second end 622 by a partial reflector (PR) facet (not shown).

In an example, the p-contact of DCICL 614 is configured to vary an amount of current injected into cavity 640 in the longitudinal direction creating a current injection gradient. Current injection can be varied by varying the resistance of DCICL 614 to enable a current injection gradient. The resistance can be graded longitudinally by several methods. For example, the material volume through which the current must pass may be varied by grading the thickness of DCICL 614 in the longitudinal direction. Material thickness $T_1$ at first end 620 is less than the material thickness $T_2$ at second end 622. The material thickness of DCICL 614 may gradually increase from first end 620 to second end 622 to create the thickness gradient. With higher resistance near second end 622 compared to first end 620, the voltage drop along the cavity 640 where it makes contact with the p-cladding layer will vary and thereby the injected current can be varied. Current injection is increased gradually from a lowest current injection amount proximate the PR facet at second end 622 to a highest current injection amount proximate the HR facet at first end 620. When diode 600 is operating the second end 622 near the PR facet tends to run at higher temperatures that the first end 620 near the HR facet 642. By varying current injection such that less current is injected near the PR facet (at end 622) than the HR facet 642 (at end 620), the longitudinal thermal gradient may be reduced which may prevent or mitigate rollover and droop in L-I for all cases but particularly for longer cavity length laser devices where the cavity lengths are greater than about 5.0 mm in length. In some examples, a current injection gradient as described herein may raise the current injection density on the order of 0.001%, 1%, 5%, 10%, 50%, 100% or >100% from second end 622 to first end 620. In other examples, a current injection gradient as described herein may raise the current injection density from second end 622 to first end 620 an amount sufficient to reduce the longitudinal thermal gradient so as to mitigate or prevent a reduction in slope efficiency that occurs when BALs are driven to higher currents. In this way, the detrimental effects (e.g., droop in slope efficiency) of driving BALs to higher currents (e.g., greater than about 10 A) may be reduced. The p-contact material of DCICL 614 may comprise any of a variety of electrical conductors such as titanium (Ti), aluminum (Al), gold (Au), nickel (Ni), platinum (Pt), gallium nitride (GaN), gallium indium nitride (GaInN) and/or the like or any combination thereof. In some examples, metal alloys with reduced conducting properties such as titanium-nitride (TiN), low temperature-grown (LTG) gallium arsenide (GaAs), or the like or any combination thereof may be used to fabricate DCICL 614 to achieve desired resistance variation. In certain embodiments, the term "reduced conducting properties" may refer to conducting properties that are lower compared to $p^{++}$ GaAs semi-metallic conductivity.

Figure 7B:
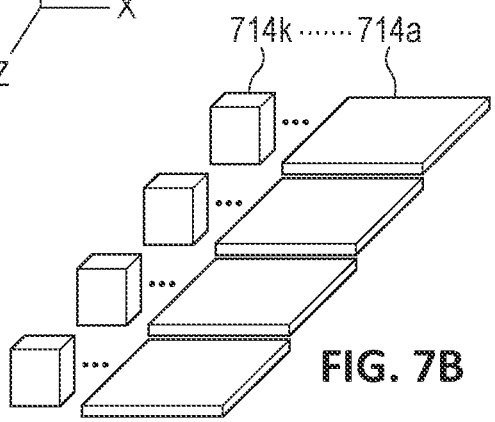
FIG. 7B illustrates an example of a surface area contact for a vertical epitaxial layer structure including a differential current injection contact layer.
Figure 7A:
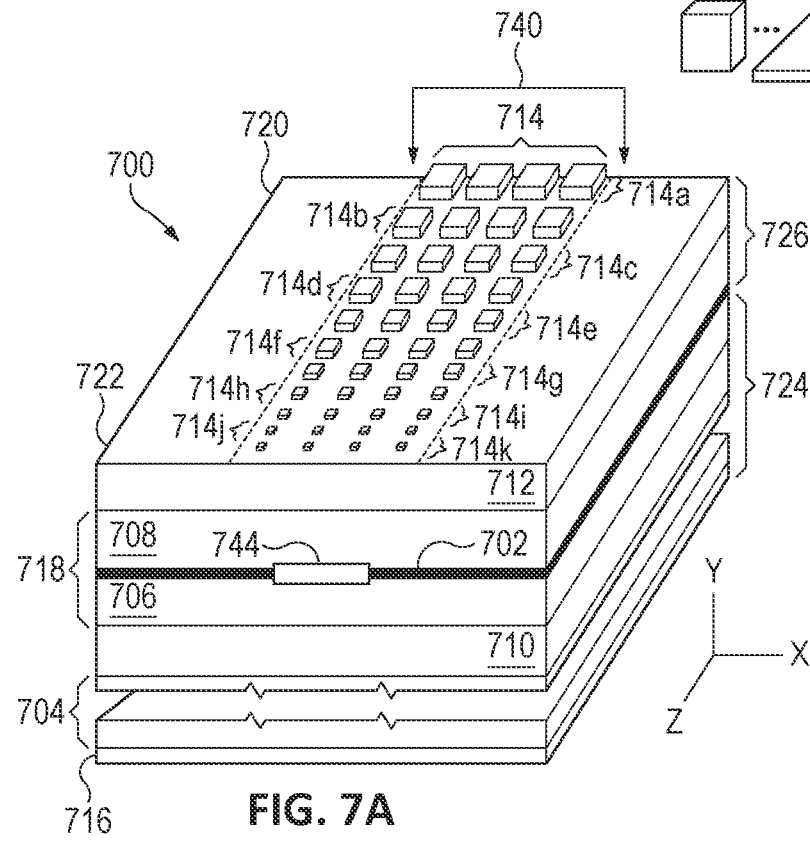
FIG. 7A illustrates a cross-sectional perspective view of an example vertical epitaxial layer structure including a differential current injection contact layer.

FIG. 7A is a cross-sectional perspective view depicting a vertical epitaxial layer structure of an example laser diode 700 including DCICL 714. In this example, longitudinal p-contact DCICL 714 pattern is configured to grade the current injection through contact size variation. Similar to laser diode 600 shown in FIG. 6, laser diode 700 is formed to include a substrate 704, an n-type semiconductor layer 706 and a p-type semiconductor layer 708. An active layer, quantum well 702, is disposed between n-type semiconductor layer 706 and p-type semiconductor layer 708. Quantum well 702, n-type semiconductor layer 706 and p-type semiconductor layer 708 make-up the transverse waveguide 718. The transverse waveguide 718 is bounded in the Y direction on n-side 724 by lower index n-cladding layer 710 and on p-side 726 by a lower index p-cladding layer 712. N-side 724 and the p-side 726 are identified with brackets. DCICL 714 is a p-contact layer and is disposed on p-cladding layer 712. N-contact 716 is positioned under substrate 704. A cavity 740 is orthogonal to the transverse waveguide 718 and is bounded in the Z direction at a first end 720 by a HR facet (not shown) and at a second end 722 by a PR facet 744. Dotted lines demark a cavity 740 current injection boundary in the longitudinal direction defined by p-contact DCICL 714.

In the current example, the p-contact layer of DCICL 714 is configured to vary an amount of current injected into cavity 740 in the longitudinal (or Z) direction by varying the surface area in contact with p-cladding layer 712. DCICL 714 comprises a number of individual contacts 714a-714k of uniform thickness. The contact sizes decrease gradually from contact row 714a to contact row 714k. In an example, smaller contact sizes (e.g., in rows 714g-714k) provide higher resistance and lower injection current density than larger contacts (e.g., in rows 714a-714f). The individual contacts (rows 714a-714k) of DCICL 714 may comprise highly doped contact material (e.g., p++ GaAs or p++ GaN) coupled to an underlying p-cladding layer 712 that is moderately doped (e.g., p+ GaAs) in order to facilitate grading of the current injection from an area of lowest current injection at or near the PR facet 744 at end 722 to an area of highest current injection at or near the HR facet at first end 720. By controlling the varied resistance along contact layer DCICL 714 it is possible to inject more current near the HR facet than near the PR facet 744. This is due in part to the higher resistance of the smaller contacts (e.g., in rows 714g-714k) at end 722 than the resistance of the larger contacts (e.g., in rows 714a-714f) at end 720. In some examples, a highly doped p-contact DCICL 714 may have concentrations of p-dopants greater than about $10^{20}$ cm$^{-3}$ while corresponding p-cladding layer 712 may be moderately doped with p-dopant concentrations from about $10^{16}$ cm$^{-3}$ to $10^{18}$ cm$^{-3}$. In other examples, a highly doped p-contact DCICL 714 may have concentrations of p-dopants greater than about $10^{18}$ cm$^{-3}$ while corresponding p-cladding layer 712 may be moderately doped with p-dopant concentrations from about $10^{14}$ cm$^{-3}$ to $10^{16}$ cm$^{-3}$. In different examples, a highly doped p-contact DCICL 714 may have concentrations of p-dopants greater than about $10^{19}$ cm$^{-3}$ while corresponding p-cladding layer 712 may be moderately doped with p-dopant concentrations less than about $10^{19}$ cm$^{-3}$. Concentrations of p-dopants in the p-contact layer DCICL 714 and corresponding p-cladding layer 712 will vary with the particular laser diode 700 design constraints and will depend on a variety of factors such as substrate, dopants, desired power conversion efficiency (PCE) and/or free carrier loss tolerance. However, in order to effectively grade the current injection in laser diode 700 through DCICL 714 the concentration of p-dopants in the p-cladding layer 712 should be less than the concentration of p-dopants in the DCICL 714 layer.

In an alternative example, the thicknesses of the individual contacts in rows 714a-714k may also be varied in order to further increase the current injection grade by more sharply grading the resistance of DCICL 714 in the cavity 740 in the longitudinal direction. For example, as shown in FIG. 7B the thickness of the smaller surface area contacts 714k may be greater than the thickness of larger contacts 714a to increase the resistance of the smaller contacts 714k with respect to the resistance of the larger contacts 714a.

In an example, p-dopants used in the DCICL 714 and/or p-cladding layer may include, nitrogen (N), phosphorus (P), boron (B), beryllium (Be), zinc (Zn), chromium (Cr), silicon (Si), germanium (Ge) and the like or any combination thereof. A wide range of patterns and fabrication processes (e.g., mesa etch, cap etch, regrowth, or implantation) to realize the patterns can be inscribed to achieve a suitable current grade and claimed subject matter is not limited in this regard.

Figure 8A:
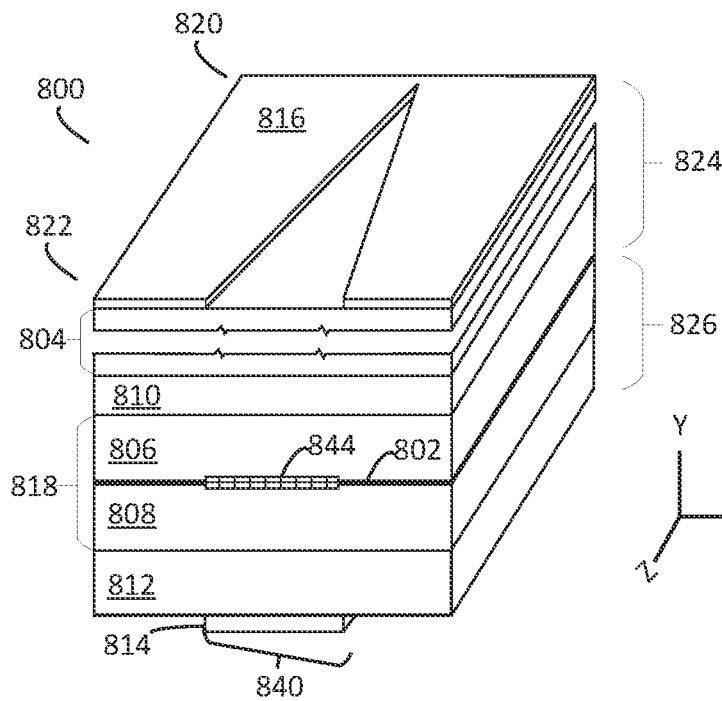
FIG. 8A is a cross-sectional perspective view depicting a vertical epitaxial layer structure including an n-type differential current injection contact layer.

FIG. 8A is a cross-sectional perspective view depicting a vertical epitaxial layer structure of an example laser diode 800 including an n-type differential current injection contact layer (DCICL) 816. In an example, laser diode 800 is formed to include a substrate 804, an n-type semiconductor layer 806 and a p-type semiconductor layer 808. An active layer, quantum well 802, is disposed between n-type semiconductor layer 806 and p-type semiconductor layer 808. An n-cladding layer 810 is disposed outside of n-type semiconductor layer 806. A p-cladding layer 812 is disposed outside of p-type semiconductor layer 808. Quantum well 802, n-type semiconductor layer 806 and p-type semiconductor layer 808 make-up the transverse waveguide 818 portion of laser diode 800. The transverse waveguide 818 is bounded in the Y direction on n-side 824 by lower index n-cladding layer 810 and on p-side 826 by a lower index p-cladding layer 812.

In the current example, DCICL 816 is an n-contact layer and is disposed on substrate 804. P-contact 814 is disposed on p-cladding layer 812. Cavity 840, defined by p-contact layer 814, is orthogonal to the transverse waveguide 818 and is bounded in the longitudinal or Z direction at a first end 820 by an HR facet (not shown) and at a second end 822 by PR facet 844.

In an example, the n-contact of DCICL 816 is configured to vary an amount of current injected into cavity 840 in the longitudinal direction. Current injection can be varied by varying the resistance of DCICL 816 by patterning the n-side metal contact of DCICL 816 to inject current with a longitudinal current density distribution with high current density near the HR facet at first end 820 compared to the current injection at second end 822 of the laser diode near PR facet 844.

Figure 8B:
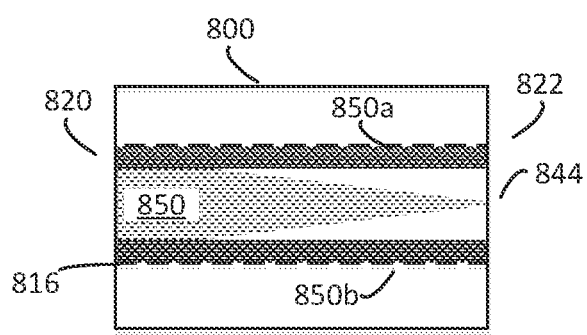
FIG. 8B is a plan view depicting a laser diode n-contact pattern of a differential current injection contact layer.

FIG. 8B is a plan view depicting laser diode 800 having an n-contact DCICL 816 with an alternative n-side metal pattern. Similar to the n-metal contact pattern shown in FIG. 8A, more metal contact material is patterned near the HR facet at end 820 and gradually decreases along the longitudinal (Z) direction. The dashed lines 850a-b show the perimeter of p-contact 814. The width of the opening towards the PR facet 844 at end 822 may match or may be wider or narrower compared to the p-contact 814 width.

The methods described above may lead to some inefficiency in the total power conversion since some of the power is dissipated in the parasitic contact or inside the device.

Figure 9A:
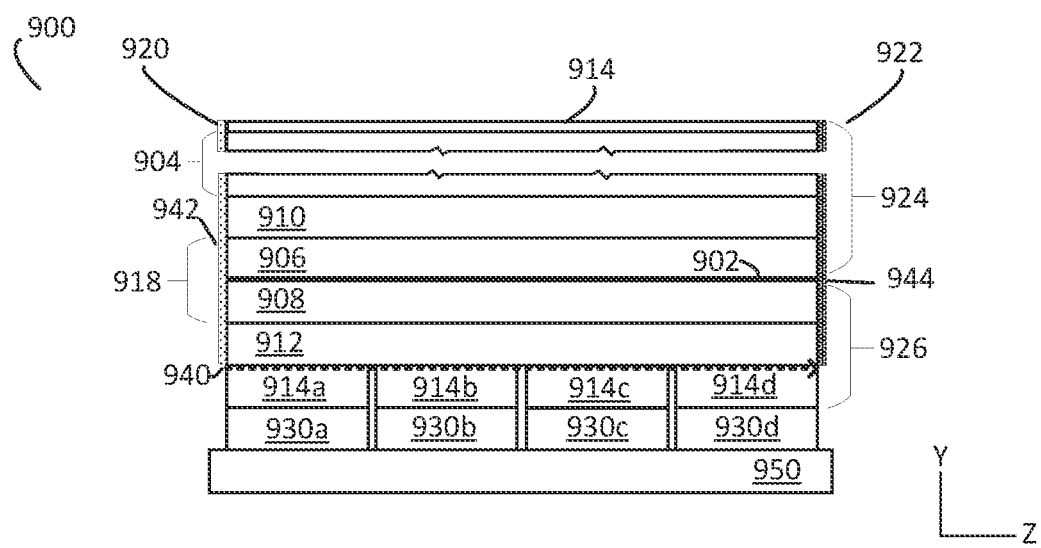
FIG. 9A is a cross-sectional view depicting a vertical epitaxial layer structure including multiple electrically isolated p-contacts configured to vary the current density along a longitudinal cavity.

FIG. 9A is a cross-sectional view depicting a vertical epitaxial layer structure of an example laser diode 900 including multiple electrically isolated p-contacts 914a, 914b, 914c and 914d configured to vary the current density along a longitudinal cavity. In an example, laser diode 900 is formed to include a substrate 904, an n-type semiconductor layer 906 and a p-type semiconductor layer 908. An active layer, quantum well 902, is disposed between n-type semiconductor layer 906 and p-type semiconductor layer 908. An n-cladding layer 910 is disposed outside of n-type semiconductor layer 906. A p-cladding layer 912 is disposed outside of p-type semiconductor layer 908. Quantum well 902, n-type semiconductor layer 906 and p-type semiconductor layer 908 make-up the transverse waveguide 918 portion of laser diode 900. The transverse waveguide 918 is bounded in the Y direction on n-side 924 by lower index n-cladding layer 910 and on p-side 926 by a lower index p-cladding layer 912.

In the current example, the multiple electrically isolated p-contacts (MEIPs) 914a-d are disposed on p-cladding layer 912. MEIPs 914a-d are each coupled to respective heat sink submounts 930a, 930b, 930c and 930d which are also segmented and electrically isolated. Submounts 930a-d are mounted to a carrier 950. The cavity 940, defined by MEIPs 914a-d, is orthogonal to the transverse waveguide 918 and is bounded in the longitudinal or Z direction at a first end 920 by an HR facet 942 and at a second end 922 by PR facet 944.

Figure 9B:
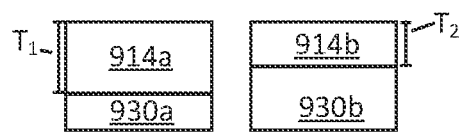
FIG. 9B illustrates an example of electrically isolated p-contacts having different thicknesses.

In an example, MEIPs 914a-d are configured to vary an amount of current injected into cavity 940 in the longitudinal direction. Current injection can be varied by electrically isolating MEIPs 914a-d and injecting varying amounts of current through each respective MEIP 914a-d (alternatively, two or more MEIPs 914a-d may contribute the same or a similar amount of current injection). Alternatively, current injection may be varied via MEIPs 914a-d by fabricating two or more MEIPs 914a-d of materials that have different resistive properties or by fabricating two or more MEIPs 914a-d to have different thicknesses. FIG. 9B illustrates an example of MEIPs 914a-b having different thicknesses $T_1$ and $T_2$, respectively; submounts 930a-b may be of different heights to accommodate variable thicknesses of MEIPs 914a-b.

In an example, MEIPs 914a-d may be divided along the longitudinal direction of cavity 940 and current densities may be varied among MEIPs 914a-d so that more current is injected via MEIPs 914a-b than MEIPs 914c-d to inject current with a discrete longitudinal current density distribution having higher current density near the HR facet at first end 920 compared to lower current injection at second end 922 near PR facet 944 of laser diode 900. It may be desirable to minimize the spectral width for the maximum current densities in each section for a given front to back length. The current densities in the various sections are tailored to keep the "canonical temperature" approximately the same which will result in the minimum spectral width. The degree of current density also varies based on the number of segments. Alternatively, multiple separate contacts can be made to the laser and change the current density along the cavity. This technique does not suffer from hit in efficiency. More or fewer MEIPs 914 may be used than are shown in the current example and claimed subject matter is not limited in this regard.

A variety of materials and methods may be used to fabricate laser diodes 600, 700, 800 and 900 described with reference to FIG. 6-9. For example, substrates 604, 704, 804 and 904 may comprise gallium arsenide (GaAs), indium phosphate (InP) or the like or any combination thereof. N-type semiconductor layers 606, 706, 806, and 906, p-type semiconductor layer 608, 708, 808, and 908, n-cladding 610, 710, 810 and 910, and/or p-cladding 612 may be grown on a corresponding substrate 604, 704, 804 and 904 and comprise a variety of materials including, any of: indium (In), gallium (Ga), aluminum (Al), arsenic (As), phosphorous (P), platinum (Pt), gold (Au), nickel (Ni), gallium arsenide (GaAs), indium phosphide (InP), aluminum gallium arsenide (AlGaAs), indium gallium arsenide phosphide (InGaAsP), indium gallium arsenide (InGaAs), or the like or any combination thereof. N-type and p-type layers may be doped with doping agents to produce the desired n-type or p-type materials. Likewise, a variety of suitable deposition processes can be used to fabricate laser diodes 600, 700, 800 and 900 including chemical vapor deposition (CVD), metalorganic chemical vapor deposition (MOCVD), and molecular beam epitaxy (MBE).

Laser diodes 600, 700, 800 and 900 are provided hereinabove for illustrative purposes and do not include an exhaustive recitation of all of the wide variety of methods and materials that may be used to fabricate such laser diodes. For example, there are a variety of alternative or additional ways to arrange disclosed laser diodes including a differential current injection contact layer. Such other example laser diodes may have more or fewer epitaxial layers, different arrangements of epitaxial layers and/or different numbers of features, structures or combinations of structures and/or features than are described in FIG. 6-9 and are intended to be within the scope of the current disclosure. Therefore, claim subject matter is not limited in this regard.

Having described and illustrated the general and specific principles of examples of the presently disclosed technology, it should be apparent that the examples may be modified in arrangement and detail without departing from such principles. We claim all modifications and variation coming within the spirit and scope of the following claims.

What is claimed is:

1. A laser diode, comprising:
   a transverse waveguide including an active layer between an n-type semiconductor layer on an n-side of the transverse waveguide and a p-type semiconductor layer on a p-side of the transverse waveguide wherein the transverse waveguide is bounded on the n-side by a lower index n-cladding layer and on the p-side by a lower index p-cladding layer;
   a cavity that is orthogonal to the transverse waveguide, wherein the cavity is bounded in a longitudinal direction at a first end by a high reflector (HR) facet and at a second end by a partial reflector (PR) facet; and
   a first contact layer configured to vary an amount of current injected into the cavity in the longitudinal direction so as to inject a first current at the first end and a second current at the second end, wherein the first current is greater than the second current,
   wherein the first contact layer defines a width in a transverse direction, a length in the longitudinal direction, and a thickness in a height direction,
   wherein the transverse direction, the longitudinal direction, and the height direction are orthogonal to one another, and
   wherein the first contact layer comprises a material where the thickness increases in the height direction longitudinally from the first end to the second end.

2. The laser diode of claim 1, wherein the first contact layer is disposed on an n-side of the transverse waveguide.

3. The laser diode of claim 1, wherein the first contact layer is disposed on p-side of the transverse waveguide.

4. The laser diode of claim 1, wherein the first contact layer comprises a uniform thickness across the width at any given location along the length.

5. The laser diode of claim 1, wherein the first contact layer comprises a resistance gradient that increases longitudinally from the first end to the second end.

6. The laser diode of claim 1, wherein the first contact layer comprises a contact material surface area gradient that decreases longitudinally from the first end to the second end.

7. The laser diode of claim 6, wherein the first contact layer comprises dopants.

8. The laser diode of claim 7, wherein the first contact layer is highly doped.

9. The laser diode of claim 7, wherein then-cladding layer underlying the first contact layer is moderately doped.

10. The laser diode of claim 7, wherein the p-cladding layer underlying the first contact layer is moderately doped.

11. The laser diode of claim 6, wherein the contact material surface area gradient comprises a contact pattern.

12. The laser diode of claim 11, wherein the contact pattern comprises a plurality of discrete contacts and is configured to grade the current injection through contact surface area size variation among different ones of the plurality of discrete contacts, wherein the surface area of the discrete contacts decreases longitudinally from the first end to the second end.

13. The laser diode of claim 11, wherein the contact pattern comprises a continuous shape configured to gradually decrease a contact material surface area distribution longitudinally from the first end to the second end.

14. The laser diode of claim 6, further comprising a second contact layer disposed opposite the first contact layer and comprising a different contact pattern.

15. The laser diode of claim 1, wherein the first contact layer comprises a metal alloy with reduced conducting properties.

16. A laser diode, comprising:
   a transverse waveguide including an active layer between an n-type semiconductor layer on an n-side of the transverse waveguide and a p-type semiconductor layer on a p-side of the transverse waveguide wherein the transverse waveguide is bounded on the n-side by a lower index n-cladding layer and on the p-side by a lower index p-cladding layer;
   a cavity that is orthogonal to the transverse waveguide, wherein the cavity is bounded in a longitudinal direction at a first end by a high reflector (HR) facet and at a second end by a partial reflector (PR) facet;
   a first p-side contact and a second p-side contact that are electrically isolated from one another, wherein the first p-side contact is disposed longitudinally proximate to the first end, wherein the second p-side contact is disposed longitudinally proximate to the second end, wherein the first and second p-side contacts are electrically coupled to the cavity and an n-side contact, wherein the first p-side contact is configured to inject a first current density into the cavity and wherein the second p-side contact is configured to inject a second current density into the cavity, and wherein the first current density is less than the second current density,
   wherein the first p-side contact and the second p-side contact define a first width and a second width in a transverse direction, a first length and a second length in a longitudinal direction, and a first thickness and a second thickness in a height direction,
   wherein the transverse direction, the longitudinal direction, and the height direction are orthogonal to one another, and
   wherein the first thickness is less than the second thickness.

17. The laser diode of claim 16, wherein the first current density and the second current density are different.

18. The laser diode of claim 16, wherein the first p-side contact and the second p-side contact are evenly distributed along the cavity.

19. The laser diode of claim 16, wherein the first p-side contact and the second p-side contact are disposed closer to the first end than the second end such that when active more current is injected into the cavity closer to the first end than the second end.

20. The laser diode of claim 16, further comprising a third p-side contact and a fourth p-side contact that are electrically isolated from one another and electrically coupled to the cavity and an n-side contact.

21. The laser diode of claim 16, wherein the first p-side contact and the second p-side contact are coupled to respective ones of a first heatsink submount and a second heatsink submount.

22. The laser diode of claim 16, wherein the first p-side contact and the second p-side contact comprise materials having different resistive properties.

* * * * *